United States Patent
Honda et al.

(10) Patent No.: US 9,368,778 B2
(45) Date of Patent: Jun. 14, 2016

(54) SEPARATOR FOR NON-AQUEOUS SECONDARY BATTERY, METHOD FOR PRODUCING THE SAME, AND NON-AQUEOUS SECONDARY BATTERY

(71) Applicant: TEIJIN LIMITED, Osaka-shi, Osaka (JP)

(72) Inventors: Susumu Honda, Iwakuni (JP); Satoshi Nishikawa, Iwakuni (JP)

(73) Assignee: TEIJIN LIMITED, Osaka (JP)

( * ) Notice: Subject to any disclaimer, the term of this patent is extended or adjusted under 35 U.S.C. 154(b) by 80 days.

(21) Appl. No.: 14/356,654

(22) PCT Filed: Nov. 12, 2012

(86) PCT No.: PCT/JP2012/079302
§ 371 (c)(1),
(2) Date: May 7, 2014

(87) PCT Pub. No.: WO2013/073503
PCT Pub. Date: May 23, 2013

(65) Prior Publication Data
US 2014/0363726 A1    Dec. 11, 2014

(30) Foreign Application Priority Data
Nov. 15, 2011    (JP) .................. 2011-249802

(51) Int. Cl.
*H01M 2/16*    (2006.01)
*H01M 2/14*    (2006.01)
(Continued)

(52) U.S. Cl.
CPC ............ *H01M 2/1686* (2013.01); *H01M 2/145* (2013.01); *H01M 2/168* (2013.01); *H01M 2/1653* (2013.01); *H01M 10/052* (2013.01); *H01M 10/0525* (2013.01)

(58) Field of Classification Search
CPC ... H01M 2/1686; H01M 2/168; H01M 2/145; H01M 2/1653; H01M 10/052; H01M 10/0525
See application file for complete search history.

(56) References Cited

U.S. PATENT DOCUMENTS

| 6,534,219 B1 * | 3/2003 | Iijima ............... H01M 10/0436 429/217 |
| 2004/0053122 A1 | 3/2004 | Sugiyama et al. |

(Continued)

FOREIGN PATENT DOCUMENTS

| JP | 63243143 | * 10/1988 | ............. B29C 47/06 |
| JP | 11-260341 A | 9/1999 | |

(Continued)

OTHER PUBLICATIONS

Encyclopedia of Polymer Science (Wiley Online Library, Published online Oct. 22, 2001 {http://onlinelibrary.wiley.com/doi/10.1002/0471440264.pst392/pdf}).*

(Continued)

*Primary Examiner* — Patrick Ryan
*Assistant Examiner* — Aaron Greso
(74) *Attorney, Agent, or Firm* — Sughrue Mion, PLLC

(57) ABSTRACT

The present invention provides a separator for a non-aqueous secondary battery including a porous substrate and an adhesive layer that is formed on at least one side of the porous substrate and is an aggregate layer of particles that contain a polyvinylidene fluoride resin and have an average particle diameter of from 0.01 μm to 1 μm, in which a content of the particles per one adhesive layer is from 0.1 g/m² to 6.0 g/m².

10 Claims, 1 Drawing Sheet

(51) Int. Cl.
*H01M 10/052* (2010.01)
*H01M 10/0525* (2010.01)

(56) References Cited

U.S. PATENT DOCUMENTS

| | | | | |
|---|---|---|---|---|
| 2006/0194103 A1* | 8/2006 | Otohata | ............... | H01G 9/016 429/185 |
| 2007/0082265 A1* | 4/2007 | Itou | ............... | H01M 4/131 429/223 |
| 2011/0027642 A1 | 2/2011 | Lee et al. | | |
| 2011/0200885 A1* | 8/2011 | Yamada | ............... | H01M 10/052 429/306 |

FOREIGN PATENT DOCUMENTS

| | | | |
|---|---|---|---|
| JP | 2000-311712 A | 11/2000 | |
| JP | 3225864 B2 | 11/2001 | |
| JP | 3225867 B2 | 11/2001 | |
| JP | 3225871 B2 | 11/2001 | |
| JP | 2003-77545 A | 3/2003 | |
| JP | 2004-111160 A | 4/2004 | |
| JP | 4127989 B2 | 7/2008 | |
| JP | 2009-70609 A | 4/2009 | |
| JP | 2010-92718 A | 4/2010 | |
| JP | 2010-244875 A | 10/2010 | |
| JP | 2011-519385 A | 7/2011 | |
| KR | 2010-0113030 * | 10/2010 | ............... C08J 9/22 |
| WO | 2010/052786 A1 | 5/2010 | |
| WO | 2010/117195 A1 | 10/2010 | |
| WO | 2012/137376 A1 | 10/2012 | |

OTHER PUBLICATIONS

PolymerProcessing (PolymerProcessing.Com {http://www.polymerprocessing.com/polymers/PVDF.html} online Wayback Machine date Apr. 26, 2001).*

Liao-Ping Cheng et al., "Formation of particulate microporous poly(vinylidene fluoride) membranes by isothermal immersion precipitation from the 1-octanol/dimethylformamide/poly(vinylidene fluoride) system", Polymer, 1999, pp. 2395-2403, vol. 40, Issue 9.

Japanese Office Action for JP 2013-511461 dated May 14, 2013.

International Search Report for PCT/JP2012/079302 dated Dec. 18, 2012.

* cited by examiner

SEPARATOR FOR NON-AQUEOUS SECONDARY BATTERY, METHOD FOR PRODUCING THE SAME, AND NON-AQUEOUS SECONDARY BATTERY

CROSS REFERENCE TO RELATED APPLICATIONS

This application is a National Stage of International Application No. PCT/JP2012/079302 filed Nov. 12, 2012 (claiming priority based on Japanese Patent Application No. 2011-249802 filed Nov. 15, 2011), the contents of which are incorporated herein by reference in their entirety.

TECHNICAL FIELD

The present invention relates to a separator for a non-aqueous secondary battery, a method for producing the same, and a non-aqueous secondary battery.

BACKGROUND ART

Non-aqueous secondary batteries, such as lithium ion secondary batteries, have been widely used as power supply for portable electronic devices such as lap-top computers, mobile phones, digital cameras, and camcorders. Further, in recent years, since these batteries have a high energy density, application of these batteries to automobiles and the like has also been studied.

In conjunction with reductions in size and weight of portable electronic devices, the outer casing of a non-aqueous secondary batteries has been simplified. Recently, as the outer casing, a battery can made of an aluminum can has been developed in place of the battery can made of stainless steel that was previously used, and further, currently, a soft pack outer casing made of an aluminum laminate pack has been developed.

In the case of a soft pack outer casing made of aluminum laminate, since the outer casing is soft, a space may form between an electrode and a separator in conjunction with charging and discharging. This is one of factors contributing to deterioration of the cycle life, and therefore, uniform retention of the adhesive property of adhered portions of electrodes, separators, or the like is one of important technical problems.

As techniques relating to the adhesive property, various techniques for improving the adhesive property between an electrode and a separator have been proposed. As one of such techniques, a technique of using a separator in which an adhesive porous layer using a polyvinylidene fluoride resin is formed on a polyolefin microporous membrane, a conventional separator, has been proposed (see, for example, Patent Documents 1 to 3). The adhesive porous layer using a polyvinylidene fluoride resin functions as an adhesive that favorably joins the electrode and the separator together, when such an adhesive porous layer and an electrode are disposed adjacently in layers and subjected to compression bonding or heat pressing in a state in which an electrolyte is contained therein. Accordingly, the porous layer contributes to improvement of the cycle life of a soft pack battery.

As described above, in a separator having a polyolefin microporous membrane and an adhesive porous layer formed thereon, from the viewpoint of achieving both ion permeability and ensuring sufficient adhesive property, a new technical proposal focusing upon the porous structure and thickness of a polyvinylidene fluoride resin layer, and a new technical proposal that uses two kinds of polyvinylidene fluoride resins in combination, have been made.

Further, from the viewpoint of ensuring adhesive property, studies on polyvinylidene fluoride resins have been made, and appropriate coating amounts and compositions have also been proposed (see, for example, Patent Documents 4 to 7).

Meanwhile, in the process of producing a battery, it is known that the handling property of a separator has a great influence on the process yield at the time of production of a battery, and a technique of forming a lubricating layer, that is formed of a filler, on a separator surface to improve the slipping property has been proposed (see, for example, Patent Document 8).

Patent Document 1: Japanese Patent No. 4127989
Patent Document 2: Japanese Patent Application Laid-Open (JP-A) No. 2009-70609
Patent Document 3: JP-A No. 2003-77545
Patent Document 4: JP-A No. H11-260341
Patent Document 5: Japanese Patent No. 3225864
Patent Document 6: Japanese Patent No. 3225867
Patent Document 7: Japanese Patent No. 3225871
Patent Document 8: JP-A No. 2010-244875

SUMMARY OF INVENTION

Technical Problem

As described in Patent Documents 1 to 3 above, in a case in which a porous layer using a polyvinylidene fluoride resin is joined to an electrode by compression bonding or heat pressing, the porous layer adheres to the binder resin that binds active substances in the electrode. Therefore, in order to ensure a more favorable adhesive property, a higher amount of binder resin in the electrode is preferable.

On the other hand, in order to further increase the energy density of a battery, it is necessary to increase the content of active substance in the electrode, and therefore, a lower content of binder resin is preferable. Therefore, according to the conventional technique described above, in order to increase the amount of active substance, it has been necessary to perform compression bonding or heat pressing under higher temperature conditions or pressure conditions, for the purpose of ensuring sufficient adhesive property. However, when increased temperature conditions or pressure conditions are applied to the compression bonding or heat pressing, there is a problem in that the porous structure of the porous layer formed of a polyvinylidene fluoride resin cannot be maintained, and ion permeability becomes insufficient and, as a result, favorable battery characteristics cannot be obtained.

Further, by the methods described in Patent Documents 4 to 7 above, in the formation of an adhesive layer, a solution obtained by dissolving polyvinylidene fluoride in a high boiling point solvent, such as N-methylpyrrolidone, is coated on a polyolefin microporous membrane, and then an electrode is affixed thereto, followed by drying. Therefore, the uniformity of the obtained integrated material is low, and there is an issue in that the solvent remains inside the battery.

Moreover, by the method described in Patent Document 8, slipping property can be ensured, but there is an issue in that the obtained separator does not have adhesion to electrodes.

The invention has been made in view of these circumstances. Under such a background, as compared with the conventional technique, a separator for a non-aqueous secondary battery which has excellent adhesion to electrodes and ensures favorable ion permeability and handling property, and a method for producing the same are required. Further, a non-aqueous secondary battery which has a high energy density and exhibits excellent cycle characteristics is required.

Solution to Problem

In order to address the problems described above, the invention is configured as follows.

<1> A separator for a non-aqueous secondary battery, the separator including a porous substrate and an adhesive layer that is formed on at least one side of the porous substrate and is an aggregate layer of particles that contain a polyvinylidene fluoride resin and have an average particle diameter of from 0.01 μm to 1 μm, in which a content of the particles per one adhesive layer is from 0.1 g/m² to 6.0 g/m².

<2> The separator for a non-aqueous secondary battery according to <1>, wherein a smoothness of a surface of the adhesive layer is 1.30 or less.

<3> The separator for a non-aqueous secondary battery according to <1> or <2>, wherein the polyvinylidene fluoride resin is a copolymer that contains structural units derived from vinylidene fluoride in an amount of 50 mol % or more, with respect to a total amount of structural units of the copolymer.

<4> The separator for a non-aqueous secondary battery according to any one of <1> to <3>, wherein the adhesive layer is formed on both sides of the porous substrate.

<5> The separator for a non-aqueous secondary battery according to <4>, wherein a total amount of the particles in the two adhesive layers formed on the porous substrate is from 0.2 g/m² to 12.0 g/m² and, of the two adhesive layers formed on the porous substrate, a difference between the amount of the particles in one adhesive layer and an amount of the particles in the other adhesive layer is 20% by mass or less, with respect to the total amount of the particles in the two adhesive layers.

<6> The separator for a non-aqueous secondary battery according to any one of <1> to <5>, wherein the porous substrate is a polyolefin microporous membrane containing polyethylene.

<7> The separator for a non-aqueous secondary battery according to <6>, wherein the polyolefin microporous membrane contains polyethylene and polypropylene.

<8> The separator for a non-aqueous secondary battery according to <6> or <7>, wherein the polyolefin microporous membrane has a multilayer structure having two or more layers, in which at least one layer of the multilayer structure is formed of polyethylene, and at least one other layer is formed of polypropylene.

<9> A method for producing a separator for a non-aqueous secondary battery, the method including coating a water-based dispersion including particles containing a polyvinylidene fluoride resin, on at least one side of a porous substrate, followed by drying, to form an adhesive layer that is an aggregate layer of particles, thereby producing the separator for a non-aqueous secondary battery according to any one of <1> to <8>.

<10> A non-aqueous secondary battery including a positive electrode, a negative electrode, and the separator for a non-aqueous secondary battery according to any one of <1> to <8>, the separator being disposed between the positive electrode and the negative electrode, wherein in the non-aqueous secondary battery, electromotive force is obtained by lithium doping/dedoping.

Advantageous Effects of Invention

According to the invention, a separator for a non-aqueous secondary battery which has excellent adhesion to electrodes, as compared with conventional separators, and ensures favorable ion permeability and handling property, and a method for producing the same may be provided.

According to the invention, a non-aqueous secondary battery which has a high energy density and exhibits excellent cycle characteristics may be provided. Moreover, it is possible to provide a high-performance non-aqueous secondary battery having an aluminum laminate pack outer casing.

DESCRIPTION OF EMBODIMENTS

Figure 1:
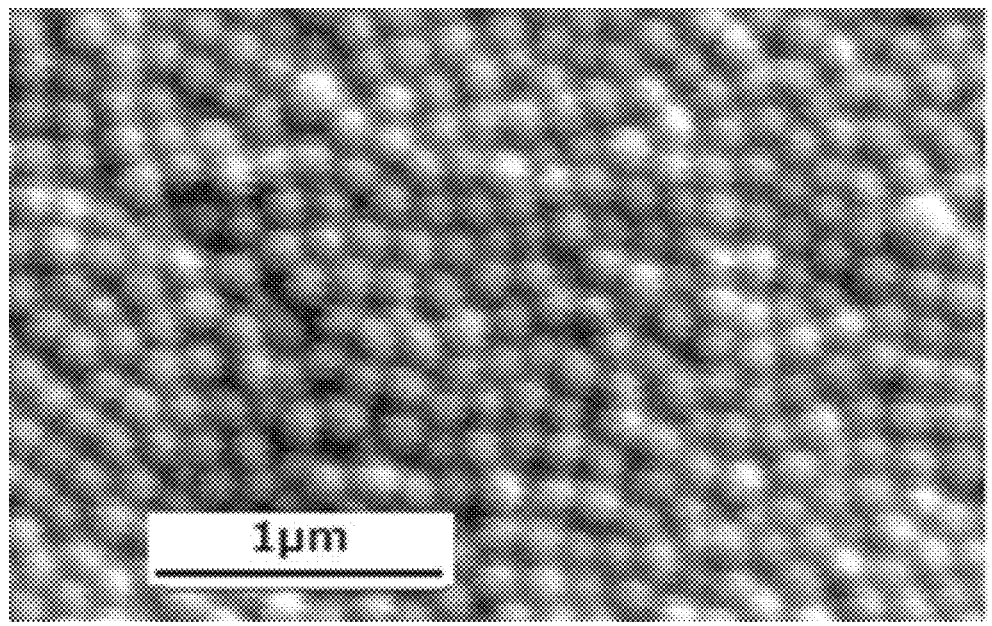
FIG. 1 shows an SEM photograph of a surface of the adhesive layer which is formed by coating in Example 1.

Hereinafter, a separator for a non-aqueous secondary battery of the invention, a method for producing the same, and a non-aqueous secondary battery using the same are described in detail. Note that, hereinafter, "to" in a numerical range means that the numerical range includes the upper limit and the lower limit.

<Separator for Non-Aqueous Secondary Battery>

The separator for a non-aqueous secondary battery of the invention is provided with a porous substrate, and an adhesive layer that is formed on at least one side of the porous substrate and is an aggregate layer of particles that contain a polyvinylidene fluoride resin, in which the average particle diameter of the particles is in a range of from 0.01 μm to 1 μm, and the content of the particles per one adhesive layer is in a range of from 0.1 g/m² to 6.0 g/m².

In the invention, the adhesive layer (preferably, adhesive porous layer) that is provided by fixing to a porous substrate is composed of an aggregate layer including a specified amount of particles that contain a polyvinylidene fluoride resin and have a specified average particle diameter, and therefore, the separator has excellent ion permeability and handling property. Further, in a case in which the separator and electrodes are subjected to compression bonding or heat pressing in a state in which the separator and the electrodes are disposed adjacently in layers, favorable adhesive property may be ensured.

Moreover, conventional separators (for example, separators equipped with a polyethylene microporous membrane) are easily oxidized inside the batteries, and the color of the separator surfaces easily changes to black; however, since the separator for a non-aqueous secondary battery of the invention has a layer containing a polyvinylidene fluoride resin, oxidation is prevented, and thus it is possible to avoid coloring of a separator.

Hereinafter, each component of the separator for a non-aqueous secondary battery of the invention is described.

[Porous Substrate]

The separator for a non-aqueous secondary battery of the invention is provided with at least one layer of a porous substrate. The term "porous substrate" used in the invention means a substrate having pores or voids inside. Examples of such a substrate include a microporous membrane, a porous sheet formed of a fibrous material, such as nonwoven fabric or a paper-like sheet, and a composite porous sheet obtained by layering one or more other porous layers on the above microporous membrane or porous sheet. Among them, a microporous membrane is particularly preferable from the viewpoints of thinning and high strength.

The term "microporous membrane" means a membrane that has a large number of micropores inside, and has a structure in which these micropores are connected, to allow gas or liquid to pass therethrough from one side to the other side.

The material that is a component of the porous substrate may be an organic material or an inorganic material, as long as the material has an electric insulating property. From the viewpoint of imparting a shutdown function to the porous substrate, the material that is a component of the porous substrate is preferably a thermoplastic resin.

The term "shutdown function" refers to the following function. Namely, in a case in which the battery temperature is raised, the constituent material melts and blocks the pores of the porous substrate, thereby blocking the ion migration, to prevent thermal runaway of the battery.

As the thermoplastic resin, a thermoplastic resin having a melting point of lower than 200° C. is suitable, and polyolefin is particularly preferable.

As a porous substrate using polyolefin, a polyolefin microporous membrane is preferable.

As the polyolefin microporous membrane, among the polyolefin microporous membranes that have been applied to conventional separators for a non-aqueous secondary battery, a polyolefin microporous membrane having sufficient dynamic physical properties and ion permeability may be preferably used.

From the viewpoint of exhibiting the shutdown function, it is preferable that the polyolefin microporous membrane contains polyethylene, and it is preferable that the content of polyethylene is 95% by mass or higher, with respect to the mass of the whole membrane.

In addition to the above, from the viewpoint of imparting heat resistance to such a degree that the membrane does not easily break when exposed to high temperatures, a polyolefin microporous membrane containing polyethylene and polypropylene is preferable. An example of such a polyolefin microporous membrane is a microporous membrane in which polyethylene and polypropylene are present as a mixture in one layer. In such a microporous membrane, it is preferable that the microporous membrane contains polyethylene in an amount of 95% by mass or more and polypropylene in an amount of 5% by mass or less, with respect to the mass of the whole membrane, from the viewpoint of achieving both the shutdown function and heat resistance. From the viewpoint of achieving both the shutdown function and heat resistance, a polyolefin microporous membrane having a multi-layer structure of two or more layers, in which at least one layer contains polyethylene and at least one layer contains propylene, is also preferable.

It is preferable that the polyolefin contained in the polyolefin microporous membrane has a weight average molecular weight of from 100,000 to 5,000,000. When the weight average molecular weight is 100,000 or more, sufficient dynamic physical properties can be ensured. Meanwhile, when the weight average molecular weight is 5,000,000 or less, the shutdown characteristics are favorable, and formation of a membrane may be carried out easily.

The polyolefin microporous membrane can be produced, for example, by the following method. Namely, an example is a method of forming a microporous membrane by: (i) extruding a molten polyolefin resin through a T-die to form a sheet, (ii) subjecting this sheet to a crystallization treatment, (iii) thereafter, stretching the sheet, and (iv) subjecting the sheet that has been stretched to a heat treatment. Further, other examples include a method of forming a microporous membrane by: (i) melting a polyolefin resin together with a plasticizer such as liquid paraffin, and extruding the melt through a T-die, followed by cooling, to form a sheet, (ii) stretching this sheet, (iii) extracting the plasticizer from the sheet that has been stretched, and (iv) subjecting the sheet to a heat treatment, and the like.

Examples of a porous sheet formed of a fibrous material include a porous sheet formed of a fibrous material such as polyester such as polyethylene terephthalate; polyolefin such as polyethylene or polypropylene; or a heat resistant polymer such as aromatic polyamide, polyimide, polyethersulfone, polysulfone, polyetherketone, or polyetherimide; and a porous sheet formed of any mixture of the fibrous materials described above.

A composite porous sheet may have a configuration in which a functional layer is disposed on a microporous membrane or a porous sheet formed of a fibrous material. Such a composite porous sheet is preferable, since a further function can be added by the functional layer. As the functional layer, for example, from the viewpoint of imparting heat resistance, a porous layer formed of a heat resistant resin or a porous layer formed of a heat resistant resin and an inorganic filler can be adopted. Examples of the heat resistant resin include one kind or two or more kinds of heat resistant polymers selected from the group consisting of aromatic polyamide, polyimide, polyethersulfone, polysulfone, polyetherketone, and polyetherimide. As the inorganic filler, a metal oxide such as alumina, a metal hydroxide such as magnesium hydroxide, or the like can be used suitably.

Examples of a method for forming a composite include a method of coating a functional layer on a microporous membrane or a porous sheet, a method of joining a microporous membrane or a porous sheet and a functional layer together using an adhesive, and a method of subjecting a microporous membrane or a porous sheet and a functional layer to compression bonding or thermocompression bonding.

The thickness of the porous substrate is preferably in a range of from 5 μm to 25 μm, from the viewpoint of obtaining favorable dynamic physical properties and internal resistance.

The Gurley value (JIS P8117) of the porous substrate is preferably in a range of from 50 sec/100 cc to 800 sec/100 cc, from the viewpoints of preventing a short circuit in a battery and obtaining sufficient ion permeability.

The porosity of the porous substrate is preferably in a range of from 20% to 60%, from the viewpoint of obtaining an appropriate membrane resistance and shutdown function.

The puncture strength of the porous substrate is preferably 300 g or more, from the viewpoint of improving the production yield.

[Adhesive Layer]

The separator for a non-aqueous secondary battery of the invention has at least one adhesive layer on one side or both sides of the porous substrate. The adhesive layer is fixed to at least one side of the porous substrate, and is an aggregate layer of particles that contain a polyvinylidene fluoride resin and have an average particle diameter of from 0.01 μm to 1 μm. This adhesive layer is configured to include the particles in an amount of from 0.1 g/m$^2$ to 6.0 g/m$^2$ per one layer.

The "aggregate layer of particles" may have (i) a configuration in which particles are dispersed as a single particle and fixed to the porous substrate, or particles are fixed to the porous substrate as an aggregate in which plural particles are aggregated, or may have (ii) a configuration in which plural particles, which are adjacent to each other, are integrally connected to each other to form a layer, and at least a part of particles in this layer is fixed to the surface of the porous substrate, so that the whole particles in the layered are fixed (for example, integrated) to the porous substrate. In the invention, the latter configuration is particularly preferable.

The structure of the adhesive layer according to the invention is not particularly limited, as long as the adhesive layer is configured to have a form that exhibits favorable ion permeation. From the viewpoint of ion permeability, it is preferable that the adhesive layer has a multipored structure (a porous structure). Further, the adhesive layer may be configured to have a dense structure, as long as the structure does not exert influence on the battery characteristics due to significant inhibition of ion permeation. Moreover, from the viewpoint of ion permeability, it is preferable that the particles containing a polyvinylidene fluoride resin retains their particle shapes in the adhesive layer.

The expression "retains their particle shapes" used herein refers to a state capable of recognizing the particle interface of the particles containing a polyvinylidene fluoride resin, when the separator for a non-aqueous secondary battery of the invention is observed by, for example, a scanning electron microscope (SEM).

The particles that are components of the adhesive layer are not limited to the particles constituted of only a polyvinylidene fluoride resin (polyvinylidene fluoride resin particles), and may be particles constituted of resin obtained by mixing a polyvinylidene fluoride resin and another resin, as long as the effects of the invention are not impaired.

The average particle diameter of the particles according to the invention is from 0.01 µm to 1 µm, preferably from 0.02 µm to 1 µm, and particularly preferably from 0.05 µm to 1 µm. When the average particle diameter is less than 0.01 µm, there is a concern that the slipping property and handling property of the separator for a non-aqueous secondary battery may be insufficient, and practically, it is also difficult to obtain such a fine polyvinylidene fluoride resin particle. Further, when the average particle diameter exceeds 1 µm, it is difficult to form a highly uniform, thin adhesive layer.

The average particle diameter of the particles is a particle diameter (medium particle diameter (D50)) at the 50% cumulative volume in the volume particle size distribution. This average particle diameter is an average particle diameter measured by using a laser diffraction particle size analyzer (MASTERSIZER 2000, manufactured by Sysmex Corporation), and using water as the dispersion medium.

The content of the particles per one adhesive layer is in a range of from 0.1 g/m$^2$ to 6.0 g/m$^2$, and preferably in a range of from 1.0 g/m$^2$ to 3.0 g/m$^2$. When the content of the particles is less than 0.1 g/m$^2$, the adhesion to electrodes deteriorates, and separation occurs easily. Further, when the content of the particles exceeds 6.0 g/m$^2$, the ion permeability inhibited, and the load characteristics of a battery are lowered.

In a case in which the adhesive layer is formed on both sides of the porous substrate, the total amount of the particles contained in the adhesive layers formed on both surfaces of the porous substrate is preferably from 0.2 g/m$^2$ to 12.0 g/m$^2$, and more preferably from 2.0 g/m$^2$ to 6.0 g/m$^2$.

In a case in which the adhesive layer is formed on both surfaces of the porous substrate as described above, the difference in weight of the particles between the front side and the back side is also important. In the invention, it is preferable that the difference between the content of the particles in the adhesive layer formed on one side of the porous substrate and the content of the particles in the adhesive layer formed on the other side is in a range of 20% or less, on the basis of mass, with respect to the total amount of the particles contained in the adhesive layers. By this range being 20% or less, curling of the separator can be maintained small, and the handling property and cycle characteristics can be maintained favorable.

The smoothness of the surface of the adhesive layer is preferably 1.30 or less, more preferably 1.25 or less, and still more preferably 1.20 or less. When the smoothness of the surface of the adhesive layer is 1.30 or less, as a separator for a non-aqueous secondary battery, an adhesive property with higher uniformity can be exhibited, which is thus preferable.

The smoothness of the surface is evaluated based on the surface area ratio (smoothness) in a 2×2 µm$^2$ visual field in AFM observation, using an atomic force microscope (AFM).

If necessary, additives such as additional inorganic compound particles or an organic compound particles can further be added to the adhesive layer in the invention, as long as the effects of the invention are not impaired. In this case, the adhesive layer contains the particles containing a polyvinylidene fluoride resin in an amount of more than or equal to 80% by mass of the total mass of the layer, and as the remainder, additives may be contained.

The adhesive layer in the invention may contain a dispersant such as a surfactant. Thereby, dispersibility, coatability, and storage stability can be enhanced. The adhesive layer in the invention may contain any of various kinds of additives such as a wetting agent that improves the affinity with the porous substrate, an antifoaming agent that suppresses incorporation of air into the coating liquid, or a pH adjusting agent including an acid or an alkali. Such an additive may be a substance that remains in the layer, as long as the substance is electrochemically stable and does not inhibit the intra-battery reaction within the range of usage of a lithium ion secondary battery.

—Polyvinylidene Fluoride Resin—

In the adhesive layer in the invention, as the polyvinylidene fluoride resin that is a component of the particles, a homopolymer of vinylidene fluoride, that is, polyvinylidene fluoride, a polyvinylidene fluoride copolymer of vinylidene fluoride and one or more other monomers that are copolymerizable with vinylidene fluoride, a mixture of polyvinylidene fluoride and an acrylic polymer, or a mixture of a polyvinylidene fluoride copolymer and an acrylic polymer can be used.

Examples of the monomer that is copolymerizable with vinylidene fluoride include tetrafluoroethylene, hexafluoropropylene, trifluoroethylene, trichloroethylene, vinyl fluoride, (meth)acrylic acid, (meth)acrylic acid ester such as methyl (meth)acrylate or ethyl (meth)acrylate, vinyl acetate, vinyl chloride, and acrylonitrile. These monomers may be used singly or in combination of two or more thereof.

Examples of the acrylic polymer include polyacrylic acid, a polyacrylic acid salt, a crosslinked polyacrylic acid, a crosslinked polyacrylic acid ester, a polymethacrylic acid ester, a crosslinked polymethacrylic acid, and a crosslinked polymethacrylic acid ester. Particularly, polyvinylidene fluoride, a copolymer of vinylidene fluoride and tetrafluoroethylene, a copolymer of vinylidene fluoride and hexafluoropropylene, a copolymer of vinylidene fluoride and trifluoroethylene, a mixture of polyvinylidene fluoride and an acrylic polymer, and a mixture of a polyvinylidene fluoride copolymer and an acrylic polymer are preferable.

It is preferable that the polyvinylidene fluoride resin is a copolymer that contains, as the structural units, structural units derived from vinylidene fluoride in an amount of 50 mol % or more, with respect to the total amount of structural units. By the inclusion of a polyvinylidene fluoride resin containing vinylidene fluoride in an amount of 50 mol % or more, even after the separator and electrodes are subjected to compression bonding or heat pressing in a state in which the separator and the electrodes are disposed adjacently in layers and, the adhesive layer can ensure sufficient dynamic physical properties.

It is known that, in non-aqueous secondary batteries, the oxidation resistance of a positive electrode generally has influence on the durability of the battery. Here, polyvinylidene fluoride resins have a high oxygen index and a high oxidation resistance. Therefore, in the invention, by using a polyvinylidene fluoride resin in the particles that are components of the adhesive layer, it is possible to improve the durability of the separator for a non-aqueous secondary battery and also the durability of the non-aqueous secondary battery. Also from this point of view, the configuration of the invention, in which particles containing a polyvinylidene fluoride resin are present, is preferable.

The molecular weight of the polyvinylidene fluoride resin is not particularly limited, but is preferably in a range of from $1 \times 10^3$ to $5 \times 10^6$ in terms of weight average molecular weight (Mw), more preferably in a range of from $1 \times 10^4$ to $2 \times 10^6$ in terms of weight average molecular weight (Mw), and still more preferably in a range of from $5 \times 10^4$ to $1 \times 10^6$ in terms of weight average molecular weight (Mw).

Here, the weight average molecular weight (Mw; Dalton) of the polyvinylidene fluoride resin is a molecular weight measured by gel permeation chromatography (GPC method) under the following conditions, and represented as a polystyrene-equivalent molecular weight.

<Conditions>
GPC: Gel Permeation Chromatograph ALLIANCE model GPC2000 (manufactured by Waters Corporation)
Column: TSKGEL GMH6-HT×2+TSKGEL GMH6-HT×2 (manufactured by Tosoh Corporation)
Mobile phase solvent: o-dichlorobenzene
Standard sample: monodispersed polystyrene [manufactured by Tosoh Corporation]
Column temperature: 140° C.

The terminal structure of the polyvinylidene fluoride resin or the catalyst for polymerizing the polymer can be arbitrary selected without any particular limitation.

The polyvinylidene fluoride resin according to the invention can be obtained preferably by emulsion polymerization or suspension polymerization, and particularly preferably by emulsion polymerization. It is also possible to select a commercially available polyvinylidene fluoride resin.

—Additive—

The adhesive layer in the invention may contain a filler formed of an inorganic substance or an organic substance, or other additive, to an extent of not impairing the effects of the invention. Thereby, it is possible to further improve the slipping property or heat resistance of the separator. In this case, it is preferable that the content or particle size of the filler is adjusted to a degree that does not inhibit the effects of the invention.

As the inorganic filler, the above-described metal oxide, metal hydroxide, or the like can be used. As the organic filler, for example, an acrylic resin or the like can be used.

<Thickener>

A thickener may be used in the invention. When the adhesive layer includes a thickener, dispersibilities of the polyvinylidene fluoride resin and the filler can be improved.

As an additive, cellulose and/or a salt of cellulose, polyvinyl alcohol, polyvinyl butyral, polyvinylpyrrolidone, polyethylene glycol, polypropylene glycol, polyacrylic acid, a resin of a higher alcohol or the like, or a salt thereof can be used in combination. Among them, cellulose and/or a salt of cellulose are preferable. The cellulose and/or salt of cellulose are not particularly limited, but examples include carboxymethyl cellulose, hydroxyethyl cellulose, hydroxypropyl cellulose, methyl cellulose, and sodium salts or ammonium salts thereof.

In the invention, the mass of the thickener relative to the total mass of the polyvinylidene fluoride resin, the filler, and the thickener is preferably 10% by mass or less, and more preferably 5% by mass or less. By the content of the thickener being 10% by mass or less, excellent adhesive property and excellent ion permeability are realized.

The separator for a non-aqueous secondary battery of the invention is configured to include the porous substrate and the adhesive layer described above. It is preferable that the adhesive layer is provided, as the outermost layer of the separator, on one side or both sides of the porous substrate. In this case, an electrode and the separator can bond to each other by the adhesive layer. Here, the adhesive layer is a layer which can bond to an electrode, when such an adhesive layer is subjected to compression bonding or heat pressing in a state in which an electrolyte is contained therein. The adhesive layer may be a layer that bonds to an electrode only by disposing the adhesive layer and the electrode adjacently in layers. The case in which the separator is bonded to both the positive electrode and the negative electrode is preferable, from the viewpoint of the cycle life. Thus, in a preferable embodiment, the adhesive layer is provided at both of one side and the other side of the porous substrate (front and back of the substrate). In a case in which the separator for a non-aqueous secondary battery of the invention has the adhesive layer only at one side of the porous substrate, the adhesive layer is bonded to either one of a positive electrode or a negative electrode. In a case in which the separator for a non-aqueous secondary battery of the invention has the adhesive layer at both sides of the porous substrate, the adhesive layers are bonded to the positive electrode and the negative electrode, respectively. By providing the adhesive layer not only at one side of the porous substrate but at both sides, when a battery is prepared therewith, the battery exhibits excellent cycle characteristics, which is thus preferable. It is because, by having the adhesive layer at both sides of the porous substrate, the two sides of the separator adhere well to the two electrodes, respectively, via the adhesive layer.

—Characteristics of Separator—

The film thickness of the separator for a non-aqueous secondary battery of the invention is preferably 30 µm or less, and more preferably 20 µm or less. When the film thickness of the separator is 30 µm or less, the energy density and output characteristics of a battery can be maintained favorable.

The membrane resistance of the separator for a non-aqueous secondary battery of the invention is preferably from 0.5 ohm·cm$^2$ to 10 ohm·cm$^2$, and more preferably from 1 ohm·cm$^2$ to 8 ohm·cm$^2$.

The puncture strength of the separator for a non-aqueous secondary battery of the invention is preferably in a range of from 10 g to 1,000 g, and more preferably from 200 g to 600 g.

—Method for Producing Separator for Non-Aqueous Secondary Battery—

The separator for a non-aqueous secondary battery of the invention is produced by coating, on at least one side of a porous substrate, a water-based dispersion including particles that contain a polyvinylidene fluoride resin, followed by drying, thereby forming an adhesive layer that is an aggregate layer of the particles.

Hereinafter, the case of using particles formed of a polyvinylidene fluoride resin is explained as an example.

Specifically, first, for example, polyvinylidene fluoride resin particles are prepared, and then a coating liquid is prepared, which includes these particles in the dispersed state by dispersing, suspending, or emulsifying these particles in the solid state in a solvent. The term "dispersed state" includes both an emulsified state (emulsion) in which a resin in the liquid state is dispersed in a solvent and a dispersed state (suspension) in which a resin in the solid state is dispersed in a solvent.

Subsequently, the obtained coating liquid is coated on at least one side of a porous substrate, followed by drying, to fix the polyvinylidene fluoride resin particles onto the porous substrate (for example, polyolefin microporous membrane), while vaporizing the solvent. In this process, it is preferable that the particles bond to the substrate, and preferably, the particles gather together and join to each other. In this step, from the viewpoint of maintaining the ion permeability more favorably, it is preferable that the polyvinylidene fluoride resin particles exist in a state in which their particle shapes are retained.

The solvent that is a component of the coating liquid is not particularly limited, as long as the solvent does not dissolve at least the polyvinylidene fluoride resin, and is a solvent that disperses, suspends, or emulsifies the polyvinylidene fluoride resin in the solid state. For example, one selected from the group consisting of water, alcohols such as methanol, ethanol, or 2-propanol, acetone, tetrahydrofuran, methyl ethyl ketone, ethyl acetate, N-methylpyrrolidone, dimethylacetamide, dimethylformamide, and dimethylformamide, or any mixture thereof is suitably used. From the environmental, safety, and economic point of view, it is preferable to use water or alcohol.

It is preferable that the separator for a non-aqueous secondary battery is produced by a method including performing coating on at least one side of a porous substrate, using a water-based dispersion including particles that contain a polvinylidene fluoride resin, and then drying the substrate.

In the invention, the moisture contained as a solvent is vaporized, and therefore, any special equipments for handling organic solvents such as acetone are not required, and thus, production cost can be reduced.

A known thickener may be added to the coating liquid. The coating liquid may be adjusted such that a viscosity suitable for coating is ensured.

Regarding the composition of the coating liquid, it is preferable that the concentration of the particles containing a polyvinylidene fluoride resin is in a range of from 1% by mass to 50% by mass, with respect to the total mass of the liquid. By adjusting the concentration of the particles, the content of the particles that exist in the separator for a non-aqueous secondary battery can be adjusted.

Regarding coating of the coating liquid on a porous substrate, a conventional coating system, for example, a Mayer bar, a die coater, a reverse roll coater, a gravure coater, a microgravure coater, spray coating, or the like, can be applied. In a case in which the particles containing a polyvinylidene fluoride resin are provided at both front and back sides of the porous substrate and fixed, the coating liquid may be coated on one side, then on the other side, and then subjected to drying; however, from the viewpoint of productivity, a method in which the coating liquid is coated simultaneously on both sides of the porous substrate and then subjected to drying is preferable.

[Non-Aqueous Secondary Battery]

The non-aqueous secondary battery of the invention uses the separator of the invention described above, and is provided with a positive electrode, a negative electrode, and the separator for a non-aqueous secondary battery of the invention described above, which is disposed between the positive electrode and the negative electrode, wherein in the non-aqueous secondary battery, electromotive force is obtained by lithium doping/dedoping.

Note that, the term "dope" means occlusion, support, adsorption, or insertion, and means a phenomenon in which a lithium ion enters into an active substance of an electrode such as a positive electrode or the like.

Non-aqueous secondary batteries have the following structure. Namely, a battery element, in which a structural body including a negative electrode and a positive electrode which face each other via a separator is impregnated with an electrolyte, is enclosed in an outer casing material. The non-aqueous secondary battery of the invention is suitable for a non-aqueous electrolyte secondary battery, and is particularly suitable for a lithium ion secondary battery.

The positive electrode may have a structure in which an active substance layer including a positive electrode active substance and a binder resin is formed on a current collector. The active substance layer may further include an electrically conductive additive.

Examples of the positive electrode active substance include lithium cobalt oxide, lithium nickel oxide, lithium manganese oxide having a spinel structure, and lithium iron phosphate having an olivine structure. In the invention, in a case in which the adhesive layer of the separator is disposed at the positive electrode side, since the polyvinylidene fluoride resin has excellent oxidation resistance, it is advantageous in that a positive electrode active substance which can be operated at a high voltage of 4.2 V or more, such as $LiMn_{1/2}Ni_{1/2}O_2$ or $LiCo_{1/3}Mn_{1/3}Ni_{1/3}O_2$, can be applied easily.

Examples of the binder resin include polyvinylidene fluoride resins.

Examples of the electrically conductive additive electrically conductive additive include acetylene black, KETJEN-BLACK, and graphite powder.

Examples of the current collector include an aluminum foil having a thickness of from 5 μm to 20 μm.

The negative electrode may have a structure in which an electrode layer, that includes a negative electrode active substance and a binder resin, is formed on a negative electrode current collector. If necessary, an electrically conductive additive may be added to the electrode layer.

Examples of the negative electrode active substance, which may be used, include carbon materials capable of electrochemically occluding lithium and materials capable of alloying with lithium, such as silicon or tin.

Examples of the binder resin include a polyvinylidene fluoride resin and a styrene-butadiene rubber. In the case of the separator for a non-aqueous secondary battery of the invention, since the adhesive property is favorable, a favorable adhesive property can be ensured not only in the case of using a polyvinylidene fluoride resin as the negative electrode binder, but also in the case of using a styrene-butadiene rubber.

Examples of the electrically conductive additive include acetylene black, KETJENBLACK, and graphite powder. Examples of the current collector include a copper foil having a thickness of from 5 μm to 20 μm.

Further, instead of using the negative electrode described above, it is also possible to use a metal lithium foil as a negative electrode.

The electrolyte is a solution obtained by dissolving a lithium salt in a non-aqueous solvent.

Examples of the lithium salt include $LiPF_6$, $LiBF_4$, and $LiClO_4$.

Examples of the non-aqueous solvent, which can be preferably used, include cyclic carbonates such as ethylene carbonate, propylene carbonate, fluoroethylene carbonate, or difluoroethylene carbonate; chain carbonates such as dimethyl carbonate, diethyl carbonate, ethyl methyl carbonate, or a fluorine substitution product thereof; cyclic esters such as γ-butyrolactone or γ-valerolactone; and any mixed solvent thereof.

Particularly, as the electrolyte, a solution is preferred, which is obtained by mixing cyclic carbonate and chain carbonate at a mass ratio (cyclic carbonate/chain carbonate) of from 20/80 to 40/60, and dissolving a lithium salt in the resulting mixed solvent to give a concentration of from 0.5 M to 1.5 M.

In a separator including a conventional adhesive porous layer, there are cases in which adhesion to electrodes is hardly exhibited, depending on the kind of electrolyte used. However, the separator of the invention has a great advantage in that favorable adhesive property can be exhibited, regardless of the kind of electrolyte.

The separator for a non-aqueous secondary battery of the invention is also applicable to a battery having a metal can outer casing. However, because of having favorable adhesion to electrodes, the separator of the invention is suitable for use in a soft pack battery having an aluminum laminate film as the outer casing material. The method for producing such a battery is as follows. Namely, a positive electrode and a negative electrode are joined via a separator, and then this joined product is impregnated with an electrolyte and enclosed in an aluminum laminate film. Thereafter, the resulting substance is subjected to compression bonding or heat pressing, whereby a non-aqueous secondary battery can be obtained. By having such a configuration, the electrodes and the separator favorably bond to each other, and thus a non-aqueous secondary battery having an excellent cycle life may be obtained. In addition, because of having favorable adhesive property between the electrodes and the separator, a battery further having excellent safety can be obtained. Examples of a method of joining electrodes and a separator include a stack method in which electrodes and a separator are disposed adjacently in layers, and a method in which electrodes and a separator are wound together. The invention is applicable to any of the above methods.

EXAMPLES

Hereinafter, the present invention is described with reference to Examples. However, it should be construed that the invention is by no means limited to the following Examples.

(Measurement and Evaluation)

With regard to the separators and lithium ion secondary batteries prepared in Examples and Comparative Examples described below, the following measurements and evaluations were performed. Results of the measurements and evaluations are shown in the tables described below.

[Average Particle Diameter of Polyviniylidene Fluoride Resin Particles]

The average particle diameter of the polyvinylidene fluoride resin particles was measured using a laser diffraction particle size analyzer (MASTERSIZER 2000, manufactured by Sysmex Corporation). In the measurement, water was used as the dispersion medium, and the medium particle diameter (D50) in the volume particle size distribution was designated as the average particle diameter.

[Film Thickness]

The thickness (μm) of the separator was determined by measuring on arbitrary selected 20 points in a 10 cm×10 cm region, using a contact thickness meter (LITEMATIC, manufactured by Mitutoyo Corporation), and arithmetically averaging the measured values. The measurement was carried out using a cylindrical measuring terminal having a diameter of 5 mm, with adjustment so that a load of 7 g was applied during the measurement.

[Weight Per Unit Area]

The separator was cut into a 10 cm×30 cm piece, and the mass of the piece was measured. The obtained mass was divided by the area to determine the weight per unit area.

[Content of Particles Formed of Polyvinylidene Fluoride Resin]

The content ($g/m^2$) of the polyvinylidene fluoride resin was measured from the intensity of the FKα spectrum, using an energy dispersion fluorescent X-ray analyzer (EDX-800HS, manufactured by Shimadzu Corporation). According to this measurement, the content of the polyvinylidene fluoride resin on the X-ray irradiated side is measured. Therefore, in a case in which the porous layer is formed at both front and back sides, the front and back are each subjected to the measurement, to measure the masses of polyvinylidene fluoride resin at the front and back, and the obtained values are summed to determine the front back total mass.

[Smoothness of Surface of Separator for Non-Aqueous Secondary Battery]

Observation was carried out using a NANO SCOPE Ma (manufactured by Digital Instruments, Inc.) as AFM, at an observation visual field of 2×2 $μm^2$ and a resolution of 256× 256 pixels or more, and surface roughness analysis attached to the device was carried out, to calculate the surface area ratio.

The "surface area ratio" refers to the ratio $S_{ratio}$ of actual surface area S relative to surface $S_0$ when the surface observed is assumed to be ideally flat, and is represented by "$S_{ratio}=S/S_0$". Evaluation was performed using the average value of 5 points selected at random in the observation visual field.

Here, SSS-NCH having an official tip diameter of 2 nm was used as a cantilever and, in order to prevent lowering of resolution at the time of observation, a new cantilever having a probe without pollution or abrasion was used. Further, the force that acts between the probe and the sample surface was set to be a necessity minimum force, so that damage of the sample and abrasion of the probe, during scanning, were prevented.

[Membrane Resistance of Separator for Non-Aqueous Secondary Battery]

The separator was cut into a size of 2.6 cm×2.0 cm, to obtain a sample piece. The sample piece that had been cut out was immersed in a methanol solution (methanol: manufactured by Wako Pure Chemical Industries, Ltd.) having 3% by mass of a nonionic surfactant (EMULGEN 210P, manufactured by Kao Corporation) dissolved therein, followed by air-drying. Two sheets of aluminum foil, which were obtained by cutting an aluminum foil having a thickness of 20 μm into a size of 2.0 cm×1.4 cm and attaching a lead tap thereto, were prepared. The sample piece that had been air-dried was sandwiched between these two sheets of aluminum foil such that the sheets of aluminum foil did not have a short circuit. Subsequently, the sample piece was impregnated with an electrolyte (1 M $LiPF_6$ propylene carbonate/ethylene carbonate (1/1 mass ratio)). Then, the sample piece was enclosed under reduced pressure in an aluminum pack, such that the tabs were outside of the aluminum pack, thereby producing a cell. In such a manner, cells in which the number of separator sheets (sample pieces) in the aluminum foil is one, two, and three, respectively, were produced.

Then, the cells thus produced were placed in a thermostat at 20° C., and the cell resistance was measured by an alternating current impedance method with 10 mV amplitude and 100 kHz frequency. The measured resistance values of the cells were plotted against the number of the separator sheets, and from these plots, the gradient was determined by linear approximation. This gradient was multiplied by 2.0 cm×1.4 cm, that is the electrode area, whereby the membrane resistance (ohm·cm$^2$) per one separator sheet was calculated.

[Handling Property]

The separator was cut into a sheet having a size of 100 mm×100 mm, and the obtained sheet was placed on a section paper. The sheet was moved to a marked point 50 cm distance apart, using a pair of tweezers. The ease of movement was ranked out of three according to the evaluation criteria described below. The sheet was moved only by using a pair of tweezers and was not moved with hands directly. Further, rubber gloves were worn over hands, during working.

<Evaluation Criteria>

A: Movement is carried out without generating any wrinkles or crimps.

B: Wrinkles are generated, but movement is carried out without generating any crimps.

C: During movement, wrinkles and crimps are generated.

[Equilibrium Moisture Content]

The separator was left to stand under an environment of a temperature of 20° C. and a relative humidity of 40% for 3 days to perform humidity conditioning, and the moisture was vaporized in a vaporizer (model VA-100, manufactured by Mitsubishi Chemical Analytech Co., Ltd.) at 120° C. Thereafter, the moisture content was measured using a Karl Fischer moisture meter (CA-100, manufactured by Mitsubishi Chemical Co., Ltd.).

[Load Characteristic]

With regard to the test batteries, the discharge capacity when discharging at 0.2 C and the discharge capacity when discharging at 2 C were measured under the temperature of 25° C., and the relative discharge capacity (%) determined from the following equation was used as an index for evaluation of load characteristics. Here, the charge condition was constant-current constant-voltage charge for 8 hours at 0.2 C and 4.2 V, and the discharge condition was constant-current discharge at 2.75 V cut-off.

Relative discharge capacity (%)=(Discharge capacity at 2 C)/(Discharge capacity at 0.2 C)×100

Note that, the index of load characteristics is also an index of ion permeability of a separator after adhesion.

[Cycle Characteristic]

With regard to the test batteries, an operation (cycle test) of repeatedly performing charging and discharging was carried out under 25° C. In this process, the charge condition was constant-current constant-voltage charge at 1 C and 4.2 V, and the discharge condition was constant-current discharge at 1 C and 2.75 V cut-off. The cycle characteristics were evaluated, using the capacity retention ratio (%) after 100 cycles as an index.

Capacity retention ratio (%)=(Discharge capacity at the 100th cycle)/(Initial discharge capacity)×100

[Adhesion to Electrode]

Five test batteries after the above cycle characteristic test were disassembled, and the peel strengths when the separator was peeled off from the negative electrode and the positive electrode, respectively, were measured using a tensile tester. Thereby, the adhesive property between the separator and the electrode was examined. The adhesive property was examined in terms of adhesive strength and uniformity.

(1) With regard to adhesive strength, the peel strength on each of the positive electrode side and the negative electrode side was ranked out of three, with respect to the peel strength in the case of using the separator of Example 1. Namely, when a peel force higher than that in Example 1 is exhibited, the adhesive strength is rated as "A"; when a peel force equivalent to that in Example 1 is exhibited, the adhesive strength is rated as "B"; and when a peel force lower than that in Example 1 is exhibited, the adhesive strength is rated as "C".

(2) With regard to uniformity, after a peel test was carried out on each of the positive electrode side and the negative electrode side, evaluation was performed according to the following evaluation criteria.

<Evaluation Criteria>

A: Almost the entire adhesive layer remains attached to the electrode surface, and favorable uniformity is exhibited.

B: Most of the adhesive layer remains attached to the electrode surface, but partially damaged, and the uniformity is in the moderate level.

C: Most of the adhesive layer does not remain attached to the electrode surface, and the adhesive layer is significantly damaged and is inferior in uniformity.

Example 1

Production of Separator for Non-Aqueous Secondary Battery

VINYCOAT PVDF AQ360 (manufactured by HIGASHI NIPPON TORYO CO., LTD.) was used as a water-based emulsion (water-based dispersion) including particles formed of a polyvinylidene fluoride resin. This emulsion was diluted, to prepare a coating liquid having a particle concentration of 3.7% by mass. Here, the average particle diameter of the particles formed of a polyvinylidene fluoride resin is 250 nm (0.25 µm), and the resin is a vinylidene fluoride/acrylic acid copolymer (vinylidene fluoride: 70 mol %). Equal amounts of this coating liquid were coated respectively on both sides of a polyethylene microporous membrane (film thickness: 9 µm, Gurley value: 160 sec/100 cc, porosity: 43%), using a #6 bar coater, followed by drying at 60° C., to form an adhesive layer having a particle content shown in Table 1 below.

The adhesive layer thus formed was observed by a scanning electron microscope (SEM). As a result, as shown in FIG. 1, although adjacent particles join each other, the particle interface can be recognized, and it is confirmed that the particles that form the adhesive layer exist in the particle state, and that the adhesive layer is an aggregate of particles. Namely, it is understood from FIG. 1 that an aggregate layer, in which adjacent particles are joined to each other, is formed.

In a manner as described above, a separator for a non-aqueous secondary battery having an adhesive layer formed on both sides of a polyethylene microporous membrane was obtained.

With regard to this separator, the average particle diameter of the particles formed of a polyvinylidene fluoride resin, the film thickness and weight per unit area of the separator, the mass of the particles (the total amount at both sides, the mass at the front side, the mass at the back side, and the ratio of the difference in mass between the front side and the back side relative to the total amount), the smoothness of the adhesive layer surface, and membrane resistance of the separator are summarized in Table 1 below.

Also with regard to the separators of Examples and Comparative Examples described below, the measurement results are summarized in Table 1.

—Production of Non-Aqueous Secondary Battery—

(Production of Negative Electrode)

300 g of artificial graphite as a negative electrode active substance, 7.5 g of a water-soluble dispersion including a modified form of a styrene-butadiene copolymer in an amount of 40% by mass as a binder, 3 g of carboxymethyl-cellulose as a thickener, and a proper quantity of water were stirred using a double-arm mixer, thereby obtaining a slurry for a negative electrode. This slurry for a negative electrode was coated on a copper foil having a thickness of 10 μm as a negative electrode current collector, and the resulting coated membrane was dried, followed by pressing, to produce a negative electrode having a negative electrode active substance layer.

(Production of Positive Electrode)

89.5 g of lithium cobalt oxide powder as a positive electrode active substance, 4.5 g of acetylene black as an electrically conductive additive, and polyvinylidene fluoride as a binder were dissolved in NMP such that the amount of the polyvinylidene fluoride was 6% by mass, and the obtained solution was stirred using a double-arm mixer such that the weight of the polyvinylidene fluoride was 6% by mass, thereby obtaining a slurry for a positive electrode. This slurry for a positive electrode was coated on an aluminum foil having a thickness of 20 μm as a positive electrode current collector, and the resulting coated membrane was dried, followed by pressing, to produce a positive electrode having a positive electrode active substance layer.

(Production of Battery)

To each of the positive electrode and negative electrode produced as described above, a lead tab was welded. Then, the positive electrode and the negative electrode were joined together via the separator produced as described above, the resulting product was impregnated with an electrolyte, and enclosed in an aluminum pack using a vacuum sealer. Here, 1 M $LiPF_6$ ethylene carbonate/ethyl methyl carbonate (=3/7 weight ratio) was used as the electrolyte. This aluminum pack was subjected to heat pressing using a heat press machine at 90° C. for 2 minutes, while applying a load of 20 kg per 1 $cm^2$ of electrode. In this way, a test battery was produced.

Example 2

A separator for a non-aqueous secondary battery according to the invention was produced and, further, a non-aqueous secondary battery was produced, in the same manner as in Example 1, except that, in Example 1, the coating liquid was diluted such that the concentration of the particles in the coating liquid was changed from 3.7% by mass to 7.4% by mass, thereby forming adhesive layers each having a particle content shown in Table 1 below.

Example 3

A separator for a non-aqueous secondary battery according to the invention was produced and, further, a non-aqueous secondary battery was produced, in the same manner as in Example 1, except that, in Example 1, the coating liquid was diluted such that the concentration of the particles in the coating liquid was changed from 3.7% by mass to 10% by mass, thereby forming adhesive layers each having a particle content shown in Table 1 below.

Example 4

A separator for a non-aqueous secondary battery according to the invention was produced and, further, a non-aqueous secondary battery was produced, in the same manner as in Example 1, except that, in Example 1, the coating liquid was diluted such that the concentration of the particles in the coating liquid was changed from 3.7% by mass to 12.5% by mass, thereby forming adhesive layers each having a particle content shown in Table 1 below.

Example 5

A separator for a non-aqueous secondary battery according to the invention was produced and, further, a non-aqueous secondary battery was produced, in the same manner as in Example 1, except that, in Example 1, the coating liquid was diluted such that the concentration of the particles in the coating liquid was changed from 3.7% by mass to 15% by mass, thereby forming adhesive layers each having a particle content shown in Table 1 below.

Example 6

A separator for a non-aqueous secondary battery according to the invention was produced and, further, a non-aqueous secondary battery was produced, in the same manner as in Example 1, except that, in Example 1, the coating liquid was diluted such that the concentration of the particles in the coating liquid was changed from 3.7% by mass to 18.5% by mass, thereby forming adhesive layers each having a particle content shown in Table 1 below.

Examples 7 and 8

Separators for a non-aqueous secondary battery according to the invention were produced and, further, a non-aqueous secondary battery was produced, in the same manner as in Example 1, except that, in Example 1, the coating amounts (coating amounts on front and back sides) of the coating liquid to be coated on one side and the other side of the microporous membrane were changed, as described in Table 1 below, thereby forming adhesive layers each having a particle content shown in Table 1 below.

Example 9

KYNAR AQUATEC (registered trademark, manufactured by Arkema Inc.) was used as a water-based emulsion including particles formed of a polyvinylidene fluoride resin. This emulsion was diluted, to prepare a coating liquid having a particle concentration of 8% by mass. Here, the average particle diameter of the particles formed of a polyvinylidene fluoride resin is 210 nm, and the resin is a vinylidene fluoride/acrylic acid copolymer (vinylidene fluoride: 70 mol %).

Then, a separator for a non-aqueous secondary battery according to the invention was produced and, further, a non-aqueous secondary battery was produced, in the same manner as in Example 2, except that the coating liquid in Example 2 was replaced with the above coating liquid.

Example 10

VINYCOAT PVDF AQ360 (manufactured by HIGASHI NIPPON TORYO CO., LTD.) as a water-based emulsion of a vinylidene fluoride/acrylic acid copolymer (vinylidene fluoride: 70 mol %) having an average particle diameter of 250 nm, and LATEX32 (manufactured by Arkema Inc.) as a water-based emulsion of polyvinylidene fluoride having an average particle diameter of 240 nm were mixed such that the mass ratio was 40/60 (=AQ360/LATEX32). This mixture was diluted to prepare a coating liquid having a particle concentration of 8% by mass.

Then, a separator for a non-aqueous secondary battery according to the invention was produced and, further, a non-aqueous secondary battery was produced, in the same manner as in Example 2, except that the coating liquid in Example 2 was replaced with the above coating liquid.

Example 11

A separator for a non-aqueous secondary battery according to the invention was produced and, further, a non-aqueous secondary battery was produced, in the same manner as in Example 2, except that the polyethylene microporous membrane in Example 2 was replaced with a polyolefin microporous membrane (film thickness: 12 μm, Gurley value: 425 sec/100 cc, porosity: 38%) having a three-layer structure of polypropylene/polyethylene/polypropylene.

Example 12

A separator for a non-aqueous secondary battery according to the invention was produced and, further, a non-aqueous secondary battery was produced, in the same manner as in Example 1, except that the coating by a #6 bar coater in Example 1 was changed to coating by spray coating of the coating liquid, thereby forming adhesive layers each having a particle content shown in Table 1 below.

Example 13

A separator for a non-aqueous secondary battery according to the invention was produced and, further, a non-aqueous secondary battery was produced, in the same manner as in Example 1, except that particles, which are formed of a polyvinylidene fluoride resin and have an average particle diameter of 50 nm, were used, instead of using the particles formed of a polyvinylidene fluoride resin (average particle diameter: 250 nm) in Example 1.

Example 14

A separator for a non-aqueous secondary battery according to the invention was produced and, further, a non-aqueous secondary battery was produced, in the same manner as in Example 1, except that particles, which are formed of a polyvinylidene fluoride resin and have an average particle diameter of 900 nm, were used, instead of using the particles formed of a polyvinylidene fluoride resin (average particle diameter: 250 nm) in Example 1.

Example 15

A separator for a non-aqueous secondary battery according to the invention was produced and, further, a non-aqueous secondary battery was produced, in the same manner as in Example 1, except that, in Example 1, the coating liquid was diluted such that the concentration of the particles in the coating liquid was changed from 3.7% by mass to 14.0% by mass, thereby forming adhesive layers each having a particle content shown in Table 1 below.

Comparative Example 1

KYNAR2851 (manufactured by ARKEM), that is a vinylidene fluoride/hexafluoropropylene copolymer, was used as the polyvinylidene fluoride resin. This polyvinylidene fluoride resin was dissolved in an 8% by mass mixed solvent (=DMA/TPG=7/3 [mass ratio]) of dimethylacetamide (DMA) and tripropylene glycol (TPG), to prepare a coating liquid. Equal amounts of this coating liquid were coated respectively on both sides of a polyethylene microporous membrane (film thickness: 9 μm, Gurley value: 160 sec/100 cc, porosity: 43%), followed by immersion in a coagulation liquid (water/dimethylacetamide/tripropylene glycol=57/30/13 [mass ratio]) at 10° C., to perform solidification. The resulting membrane was washed with water, followed by drying, to obtain a separator for a non-aqueous secondary battery having an adhesive porous layer made of a polyvinylidene fluoride resin formed on a polyolefin microporous membrane.

Figure 2:
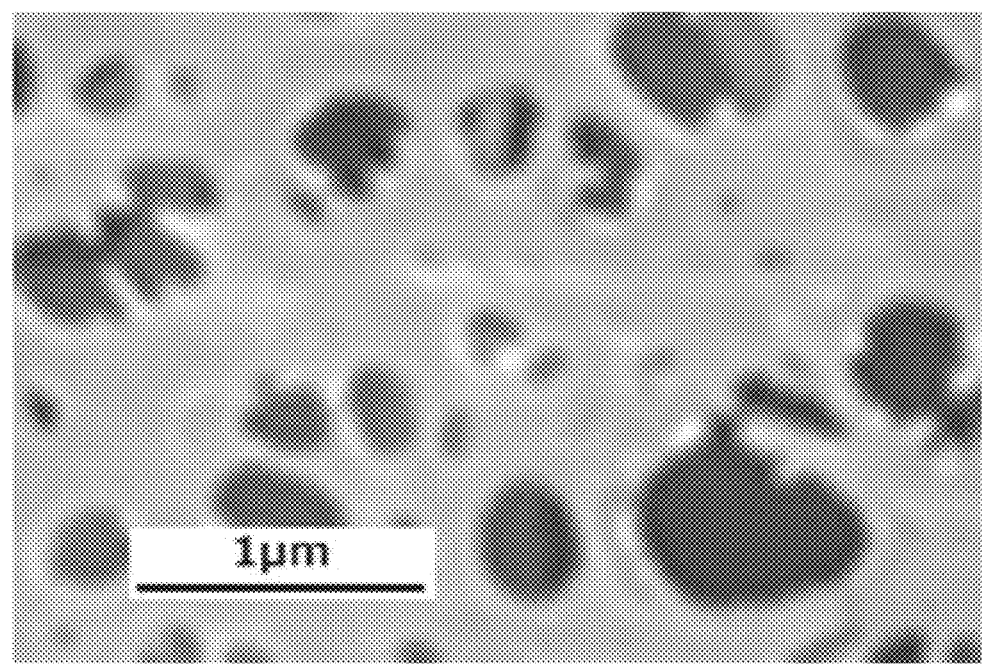
FIG. 2 shows an SEM photograph of a surface of the adhesive layer which is formed by coating in Comparative Example 1.

In the adhesive layer thus formed, as shown in FIG. 2, particle interfaces are not recognized in the layer, an aggregate layer in which particles are aggregated is not formed, and a continuous uniform layer is observed. Note that, FIG. 2 is a scanning electron microscope (SEM) photograph.

Comparative Example 2

2.5 g of polyvinylidene fluoride (PVDF) particles (VP850, manufactured by Daikin Industries, Ltd.) having an average particle diameter of 6 μm, and 47.5 g of ethanol were mixed, and the mixture was irradiated with ultrasonic waves in an ultrasonic washing machine, thereby preparing a coating liquid including PVDF particles dispersed therein. The PVDF particles precipitated with time, and, therefore, the stability of the coating liquid was extremely unfavorable.

Equal amounts of this coating liquid were coated respectively on both surfaces of a polyethylene microporous membrane (film thickness: 9 μm, Gurley value: 160 sec/100 cc, porosity: 43%) using a #6 bar coater, followed by drying at 60° C., to produce a separator for a non-aqueous secondary battery.

At the time of coating, clogging by PVDF particles occurred, and it was hard to carry out uniform coating. Further, adhesive property between the polyethylene microporous membrane and the PVDF particles was unfavorable, and powder falling was observed.

Comparative Example 3

A separator for a non-aqueous secondary battery was produced and, further, a non-aqueous secondary battery was produced, in the same manner as in Example 1, except that, in Example 1, the weights of the particles coated on the front and back sides were each changed to 0.05 g/m$^2$.

Comparative Example 4

A separator for a non-aqueous secondary battery was produced and, further, a non-aqueous secondary battery was produced, in the same manner as in Example 1, except that, in Example 1, the weights of the particles coated on the front and back sides were each changed to 7.0 g/m$^2$.

Comparative Example 5

A separator for a non-aqueous secondary battery according to the invention was produced and, further, a non-aqueous secondary battery was produced, in the same manner as in Example 1, except that particles, which are formed of a polyvinylidene fluoride resin and have an average particle diameter of 8 nm, were used, instead of using the particles formed of a polyvinylidene fluoride resin (average particle diameter: 250 nm) in Example 1.

Comparative Example 6

A separator for a non-aqueous secondary battery according to the invention was produced and, further, a non-aqueous secondary battery was produced, in the same manner as in Example 1, except that particles, which are formed of a polyvinylidene fluoride resin and have an average particle diameter of 1.1 μm, were used, instead of using the particles formed of a polyvinylidene fluoride resin (average particle diameter: 250 nm) in Example 1.

TABLE 1

| | Average Particle Diameter [μm] | Film Thickness [μm] | Weight Per Unit Area [g/m$^2$] | Content of Particles (PVDF Resin) [g/m$^2$] | | | | Smoothness | Membrane Resistance [Ω·cm$^2$] |
|---|---|---|---|---|---|---|---|---|---|
| | | | | Total Amount | Front | Back | Difference Between Front and Back (*2) | | |
| Example 1 | 0.25 | 9.7 | 5.8 | 0.5 | 0.25 | 0.25 | 0% | 1.2 | 2.9 |
| Example 2 | 0.25 | 10.5 | 7.3 | 2 | 1 | 1 | 0% | 1.15 | 4.1 |
| Example 3 | 0.25 | 11 | 7.5 | 2.2 | 1.1 | 1.1 | 0% | 1.1 | 4.2 |
| Example 4 | 0.25 | 11.5 | 8.3 | 3 | 1.5 | 1.5 | 0% | 1.07 | 4.7 |
| Example 5 | 0.25 | 11.8 | 9.3 | 4 | 2 | 2 | 0% | 1.07 | 5.3 |
| Example 6 | 0.25 | 12.2 | 10.2 | 4.9 | 2.45 | 2.45 | 0% | 1.06 | 5.8 |
| Example 7 | 0.25 | 10.9 | 7.5 | 2.2 | 1.3 | 0.9 | 18% | 1.12 | 4.2 |
| Example 8 | 0.25 | 11.1 | 7.5 | 2.2 | 1.6 | 0.6 | 45% | 1.18 | 4.3 |
| Example 9 | 0.21 | 10.6 | 7.3 | 2 | 1 | 1 | 0% | 1.16 | 4 |
| Example 10 | 0.25/0.24 | 10.6 | 7.3 | 2 | 1 | 1 | 0% | 1.15 | 4.2 |
| Example 11 | 0.25 | 13 | 9.6 | 2 | 1 | 1 | 0% | 1.15 | 3.8 |
| Example 12 | 0.25 | 10 | 5.8 | 0.5 | 0.27 | 0.23 | 8% | 1.4 | 3.1 |
| Example 13 | 0.05 | 9.5 | 5.8 | 0.5 | 0.25 | 0.25 | 0% | 1.04 | 4.7 |
| Example 14 | 0.90 | 10.1 | 5.8 | 0.5 | 0.25 | 0.25 | 0% | 1.35 | 2.9 |
| Example 15 | 0.25 | 17.4 | 11.3 | 6 | 3 | 3 | 0% | 1.5 | 5.9 |
| Comparative Example 1 | — | 12 | 7.3 | 2 | 1 | 1 | 0% | 1.31 | 3.5 |
| Comparative Example 2 | 6 | 23.5 | 7.5 | 2.2 | 1.2 | 1 | 9% | 1.5 | 5.2 |
| Comparative Example 3 | 0.25 | 9.7 | 5.4 | 0.09 | 0.05 | 0.05 | 0% | 1.38 | 2.8 |
| Comparative Example 4 | 0.25 | 17.7 | 19.3 | 14 | 7 | 7 | 0% | 1.07 | 11.7 |
| Comparative Example 5 | 0.008 | 9.5 | 5.8 | 0.5 | 0.25 | 0.25 | 0% | 1.04 | 5.5 |
| Comparative Example 6 | 1.1 | 11.2 | 5.8 | 0.5 | 0.25 | 0.25 | 0% | 1.45 | 2.8 |

(*1) PVDF: polyvinylidene fluoride
(*2) Difference between Front and Back (%): Difference between the amount of particles on one side (front side) of the microporous membrane and the amount of particles on the other side (backside) = {|Amount of particles on the front side − Amount of particles on the backside|/Total amount of the particles on both sides} × 100

TABLE 2

| | Handling Property | Load Characteristic | Cycle Characteristic | Adhesion to Electrode | | | |
|---|---|---|---|---|---|---|---|
| | | | | Positive Electrode | | Negative Electrode | |
| | | | | Adhesive Strength | Uniformity | Adhesive Strength | Uniformity |
| Example 1 | A | 85% | 86% | B | B | B | B |
| Example 2 | A | 95% | 96% | A | A | A | A |
| Example 3 | A | 95% | 95% | A | A | A | A |
| Example 4 | A | 94% | 95% | A | A | A | A |
| Example 5 | A | 91% | 93% | A | A | A | A |
| Example 6 | A | 90% | 91% | A | A | A | A |
| Example 7 | A | 93% | 91% | A | B | B | B |
| Example 8 | A | 88% | 86% | A | B | B | B |
| Example 9 | A | 94% | 93% | A | A | A | A |
| Example 10 | A | 93% | 93% | A | A | A | A |
| Example 11 | A | 94% | 95% | A | A | A | A |
| Example 12 | A | 83% | 82% | B | B | B | B |
| Example 13 | A | 84% | 86% | B | A | B | A |
| Example 14 | A | 85% | 86% | B | B | B | B |
| Example 15 | A | 89% | 89% | A | A | A | A |
| Comparative Example 1 | B | 95% | 95% | A | A | A | A |
| Comparative Example 2 | C | 80% | 75% | B | C | B | C |
| Comparative Example 3 | C | 76% | 70% | C | C | C | C |

TABLE 2-continued

| | Handling Property | Load Characteristic | Cycle Characteristic | Adhesion to Electrode | | | |
|---|---|---|---|---|---|---|---|
| | | | | Positive Electrode | | Negative Electrode | |
| | | | | Adhesive Strength | Uniformity | Adhesive Strength | Uniformity |
| Comparative Example 4 | A | Membrane resistance is high; Not conducted | Membrane resistance is high; Not conducted | A | A | A | A |
| Comparative Example 5 | C | 80% | 75% | C | C | C | C |
| Comparative Example 6 | A | 82% | 73% | C | C | C | C |

Further, the equilibrium moisture content of each of the separators of Examples and Comparative Examples described above was measured. It was revealed that, in all separators, the equilibrium moisture content was 1,000 ppm or less.

[Heat Resistance Evaluation]

Among the above Examples, the heat resistance of the separator of Example 1 and the heat resistance of the separator of Example 11 were compared by thermomechanical analysis (TMA). Specifically, each separator was cut into a piece having a width of 4 mm and the piece was set such that the distance between chucks was 10 mm. Under an applied load of 10 mN, the temperature was elevated at a temperature elevating rate of 10° C./min, and the temperature at which the separator broke was measured.

As a result, it was found that the separator of Example 1 broke at 155° C., while the separator of Example 11 broke at 180° C. From the result, it is understood that the use of polypropylene is preferable, from the viewpoint of heat resistance.

INDUSTRIAL APPLICABILITY

The separator for a non-aqueous secondary battery of the invention is suitable for use in a non-aqueous secondary battery. The separator is particularly suitable for use in a non-aqueous secondary battery having an aluminum laminate outer casing material, in which joining to electrodes is important.

The disclosure of Japanese Patent Application No. 2011-249802 is incorporated by reference herein in its entirety.

All publications, patent applications, and technical standards mentioned in this specification are herein incorporated by reference to the same extent as if such individual publication, patent application, or technical standard was specifically and individually indicated to be incorporated by reference.

The invention claimed is:

1. A separator for a non-aqueous secondary battery, the separator comprising:
a porous substrate; and
an adhesive layer that is formed on at least one side of the porous substrate and is an aggregate layer of particles that contain a polyvinylidene fluoride resin and have an average particle diameter of from 0.01 μm to 1 μm, in which a content of the particles per one adhesive layer is from 0.1 g/m² to 6.0 g/m²;
wherein the particles retain their particle shapes in the adhesive layer.

2. The separator for a non-aqueous secondary battery according to claim 1, wherein a smoothness of a surface of the adhesive layer is 1.30 or less, wherein the smoothness of the surface is evaluated based on surface area ratio (smoothness) in a 2×2 μm² visual field in AFM observation, using an atomic force microscope (AFM).

3. The separator for a non-aqueous secondary battery according to claim 1, wherein the polyvinylidene fluoride resin is a copolymer that contains structural units derived from vinylidene fluoride in an amount of 50 mol % or more, with respect to a total amount of structural units of the copolymer.

4. The separator for a non-aqueous secondary battery according to claim 1, wherein the adhesive layer is formed on both sides of the porous substrate.

5. The separator for a non-aqueous secondary battery according to claim 4, wherein
a total amount of the particles in the two adhesive layers formed on the porous substrate is from 0.2 g/m² to 12.0 g/m², and
of the two adhesive layers formed on the porous substrate, a difference between an amount of the particles in one adhesive layer and an amount of the particles in the other adhesive layer is 20% by mass or less, with respect to the total amount of the particles in the two adhesive layers.

6. The separator for a non-aqueous secondary battery according to claim 1, wherein the porous substrate is a polyolefin microporous membrane containing polyethylene.

7. The separator for a non-aqueous secondary battery according to claim 6, wherein the polyolefin microporous membrane comprises polyethylene and polypropylene.

8. The separator for a non-aqueous secondary battery according to claim 6, wherein the polyolefin microporous membrane has a multilayer structure having two or more layers, in which at least one layer of the multilayer structure includes polyethylene, and at least one other layer includes polypropylene.

9. A method for producing a separator for a non-aqueous secondary battery, the method including coating a water-based dispersion including particles containing a polyvinylidene fluoride resin, on at least one side of a porous substrate, followed by drying, to form an adhesive layer that is an aggregate layer of the particles, thereby producing the separator for a non-aqueous secondary battery according to claim 1.

10. A non-aqueous secondary battery comprising a positive electrode, a negative electrode, and the separator for a non-aqueous secondary battery according to claim 1, the separator being disposed between the positive electrode and the negative electrode, wherein in the non-aqueous secondary battery, electromotive force is obtained by lithium doping/dedoping.

* * * * *